(12) United States Patent
Weiss et al.

(10) Patent No.: US 8,480,536 B2
(45) Date of Patent: Jul. 9, 2013

(54) HYBRID DRIVE HAVING A SEPARATING CLUTCH WHICH ASSISTS A DIRECT START

(75) Inventors: Ruediger Weiss, Moetzingen (DE); Mario Kustosch, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 964 days.

(21) Appl. No.: 12/162,819

(22) PCT Filed: Jan. 30, 2007

(86) PCT No.: PCT/EP2007/050867
§ 371 (c)(1), (2), (4) Date: Nov. 14, 2008

(87) PCT Pub. No.: WO2007/099003
PCT Pub. Date: Sep. 7, 2007

(65) Prior Publication Data
US 2009/0105038 A1    Apr. 23, 2009

(30) Foreign Application Priority Data
Feb. 24, 2006    (DE) .......................... 10 2006 008 640

(51) Int. Cl.
B60W 20/00    (2006.01)
(52) U.S. Cl.
USPC .......................... 477/5; 180/65.25; 180/65.28
(58) Field of Classification Search
USPC .......................... 180/65.25, 65.28
See application file for complete search history.

(56) References Cited

U.S. PATENT DOCUMENTS

| | | | |
|---|---|---|---|
| 6,504,259 B1 * | 1/2003 | Kuroda et al. | 290/40 C |
| 6,543,565 B1 * | 4/2003 | Phillips et al. | 180/165 |
| 6,722,332 B2 * | 4/2004 | Kojima | 123/179.3 |
| 6,807,934 B2 | 10/2004 | Kataoka et al. | |
| 6,931,318 B2 * | 8/2005 | Kaita et al. | 701/113 |
| 7,013,213 B2 * | 3/2006 | McGee et al. | 701/113 |
| 7,074,156 B2 * | 7/2006 | Graf et al. | 477/5 |
| 7,079,942 B2 * | 7/2006 | McGee et al. | 701/113 |
| 7,085,631 B2 * | 8/2006 | McGee et al. | 701/22 |
| 7,160,225 B2 | 1/2007 | Berger et al. | |
| 7,213,665 B2 * | 5/2007 | Yamaguchi et al. | 180/65.27 |
| 7,214,156 B2 * | 5/2007 | Oliver | 475/8 |
| 7,216,729 B2 * | 5/2007 | Syed et al. | 180/65.28 |
| 7,273,119 B2 * | 9/2007 | Tsuneyoshi et al. | 180/65.28 |
| 7,350,602 B2 * | 4/2008 | Colvin et al. | 180/65.28 |
| 7,370,715 B2 * | 5/2008 | Colvin et al. | 180/65.28 |
| 7,380,620 B2 * | 6/2008 | Suzuki | 180/65.28 |
| 7,407,026 B2 * | 8/2008 | Tamor | 180/65.28 |
| 7,469,667 B2 * | 12/2008 | Leone et al. | 123/90.15 |
| 7,481,199 B2 * | 1/2009 | Nakamura | 123/345 |
| 7,546,821 B2 * | 6/2009 | Russell et al. | 123/90.12 |
| 7,552,705 B2 * | 6/2009 | Serkh et al. | 123/179.4 |
| 7,726,270 B2 * | 6/2010 | Miwa et al. | 123/179.3 |
| 7,770,678 B2 * | 8/2010 | Nozaki et al. | 180/65.6 |
| 2002/0094908 A1 | 7/2002 | Urasawa et al. | |
| 2004/0149247 A1 | 8/2004 | Kataoka et al. | |

FOREIGN PATENT DOCUMENTS

| | | |
|---|---|---|
| DE | 10006861 | 11/2000 |
| DE | 10025853 | 4/2001 |

(Continued)

OTHER PUBLICATIONS

International Search Report, PCT International Patent Application No. PCT/EP2007/050867, dated May 29, 2007.

*Primary Examiner* — Jeffrey J Restifo
(74) *Attorney, Agent, or Firm* — Kenyon & Kenyon LLP

(57) ABSTRACT

A method for operating a hybrid drive of a vehicle, having an internal combustion engine and having at least one electric drive, to which at least one traction battery is assigned, as well as to a hybrid drive, especially a parallel hybrid drive. The internal combustion engine is able to be started from the operating mode "purely electrical driving" of the hybrid drive using a direct start without a starter.

12 Claims, 6 Drawing Sheets

FOREIGN PATENT DOCUMENTS

| | | |
|---|---|---|
| DE | 10316422 | 12/2003 |
| DE | 103 03 822 | 8/2004 |
| DE | 10 2004 007 001 | 9/2004 |
| DE | 102004005268 | 9/2004 |
| DE | 10356384 | 6/2005 |
| DE | 102004023673 | 12/2005 |
| EP | 1582737 | 10/2005 |
| EP | 1586767 | 10/2005 |
| JP | 11-082260 | 3/1999 |
| WO | WO 01/56824 | 8/2001 |

\* cited by examiner and subsequently is operated at its own power. The pulling on of the internal combustion engine comes about via the separating clutch between the at least one electric drive and the internal combustion engine by a slip torque adjusted at the separating clutch.

HYBRID DRIVE HAVING A SEPARATING CLUTCH WHICH ASSISTS A DIRECT START

BACKGROUND INFORMATION

A pulse start method and a pulse start device for an internal combustion engine are described in German Patent Application No. DE 103 56 384 C1. According to the pulse start method described in German Patent Application No. DE 103 56 384 C1, during a wind-up phase, a flywheel is accelerated in rotary drive and subsequently, during a coupling phase, the rotating flywheel is coupled to a rotatably supported shaft, preferably the crankshaft of the internal combustion engine, for the transmission of torque. During the wind-up phase and/or the coupling phase, the speed pattern of the flywheel is evaluated, and it is derived from this evaluation whether a successful start of the internal combustion engine is possible. If a successful start of the internal combustion engine is not to be expected, the internal combustion engine is brought via the shaft to an operating position favorable for a subsequent second starting attempt. According to the pulse start method described in German Patent Application No. DE 103 56 384 C1, during the wind-up phase, the gradient of the speed pattern of the flywheel is used for the evaluation, and if the gradient is too low, the coupling phase is initiated. Hybrid drives for motor vehicles generally include an internal combustion engine and at least one additional drive, as for instance at least one electric drive. Using vehicles equipped with a hybrid drive, one may implement a purely electrical driving operation. If the electrical energy or the power output of the battery included in the traction network of the hybrid drive gets close to its limits, the internal combustion engine is switched on. For this purpose, it is started and a separating clutch separating the internal combustion engine from at least one electric drive should be closed. In conventional design approaches, the internal combustion engine is suddenly pulled on by the closing of the clutch. A special clutch is frequently used for this purpose, that is designed for a correspondingly high energy input. The energy required for starting the internal combustion engine of the hybrid drive is established by the magnitude of the internal combustion engine drag torque and the difference in rotational speed between the stationary internal combustion engine and the at least one electric drive that is in rotation, as well as the duration of the starting process for starting the internal combustion engine. The pulling on of the internal combustion engine using the above-mentioned clutch generally leads to a negative influence on the traction, that is, the propulsion of the vehicle, since the power required for starting the internal combustion engine is at the expense of the propulsion. Furthermore, the torque pattern in the drive train of a vehicle having hybrid drive, during this process, namely the direct start of the internal combustion engine from the purely electrical driving operation, may be interfered with by vibrations or excess torque. These interferences may not be compensated for at all, in part, or compensated for only with great effort, and in this connection, drive types having constant power transmission to the driving wheels, such as classical automatic transmissions having torque converters, are especially affected by the loss of comfort.

One possibility for a remedy is starting the internal combustion engine of a hybrid drive using a separate starter. The disadvantages that go along with this design approach are in the higher costs for the starter as well as the typical noise during the external start, which originates from the engaging of the starter and the engine compression before the first combustion stroke.

In hybrid drive vehicles, the demand for a noise-free transition from the purely electrical driving operation to the hybrid operation is particularly great since the purely electrical driving operation essentially proceeds without noise, and criteria have been set very high by existing mass-produced vehicles having hybrid drive.

SUMMARY

In accordance with the present invention, an example hybrid drive, especially a parallel hybrid drive for a vehicle, into whose drive train an internal combustion engine is integrated, especially one that has direct fuel injection, as well as a separating clutch between the internal combustion engine and at least one electrical drive. For a parallel hybrid drive, furthermore, the drive train, provided according to the example embodiment of the present invention, includes a vehicle drive as well as an electrical traction accumulator, such as a high voltage battery.

The example drive train may advantageously be used for the purely electrical operation of the motor vehicle, in which the separating clutch between the at least one electric drive and the internal combustion engine of the parallel hybrid drive is open. If the power of the electrical traction branch, which includes the electrical traction accumulator as well as the at least one electric drive, is no longer sufficient for the propulsion, the internal combustion engine is put in rotation using a direct start. The direct start is a specialty of an internal combustion engine having direct fuel injection, such as an Otto engine having direct gasoline injection. The direct start takes place purely by the functioning of the internal combustion engine without the aid of other aggregates.

The use of a direct fuel injecting internal combustion engine, such as an Otto engine having direct gasoline injection within a parallel hybrid drive train, has the advantage, on the one hand, that at the starting of the internal combustion engine using, for instance, direct gasoline injection, only a slight noise emission is created compared to when starting this internal combustion engine by a conventional engine starter. In addition, when a direct injecting internal combustion engine is used, such as a direct gasoline injecting Otto engines in parallel hybrid drive trains, a starter may be omitted, whereby there is a gain in installation space. Moreover, because of the example design approach provided according to the present invention, there comes about a traction-neutral starting of the internal combustion engine at a given power transmission to the driven wheels, as well as a very short starting time.

In direct fuel injecting internal combustion engines, such as in Otto engines having direct gasoline injection, fuel is injected into, and ignited in the combustion chamber that is in the power stroke position. The assumption for a successful start of the direct fuel injecting internal combustion engine is a crankshaft position between 1000 and 1200 after top dead center. Beyond that point, no residual gas, or only a small quantity, is permitted to be in the respective cylinder. If the internal combustion engine is shut down, it oscillates within a "settling oscillation range" until the crankshaft stops at a position within this range. Since it is not certain that the internal combustion engine will stop at exactly the targeted shut-down range, that is, at a crankshaft position between 100° and 120° after top dead center, that enables a successful start, one makes use of the dynamic direct start. In the dynamic direct start, the internal combustion engine is moved by an external force, in this case, the use of a parallel hybrid drive by a separating clutch controlled by slip torque.

In one hybrid drive train, especially a parallel hybrid drive train, an internal combustion engine having direct fuel injection, such as an Otto engine having direct gasoline injection, in which the direct start, and particularly the dynamic direct start, is able to be carried out, offers new possibilities. The direct start or the dynamic direct start may be used for starting the direct fuel injecting internal combustion engine right from the electrical driving operation of the vehicle.

By contrast to conventional drive trains of vehicles, the separating clutch may be used to move the direct fuel injecting internal combustion engine. This is optimal in comparison to a design approach in which a starter would have to be used, with respect to the noise that would occur and the wear on the component parts that would set in over its service life.

The clutch used is preferably a slip torque-controlled clutch. In one system structure for controlling the cooperation of the components of the parallel hybrid drive, that is, for the direct fuel injecting internal combustion engine, which has at least one electric drive and for the preferably slip-controlled separating clutch, a control of the overall system (hybrid control), a control of the internal combustion engine (engine control), as well as a control of the at least one electric drive (I-drive control), as well as a control of the separating clutch (clutch control) are implemented, this system structure being able to be distributed to one or more control units. The driver of the vehicle having the parallel hybrid drive, provided according to the present invention, sets his demands for the drive torque to be given off to the driven wheels via the position of the accelerator. This specification is interpreted by the component accelerator as the torque command. The control of the overall system (hybrid control) first converts this specification of the torque command by the driver, first of all, purely electrically, that is, using the at least one electric drive, and the internal combustion engine is, first of all, not operated.

BRIEF DESCRIPTION OF THE DRAWINGS

The present invention will be explained in greater detail on the basis of the figures.

DETAILED DESCRIPTION OF EXAMPLE EMBODIMENTS

Figure 1:
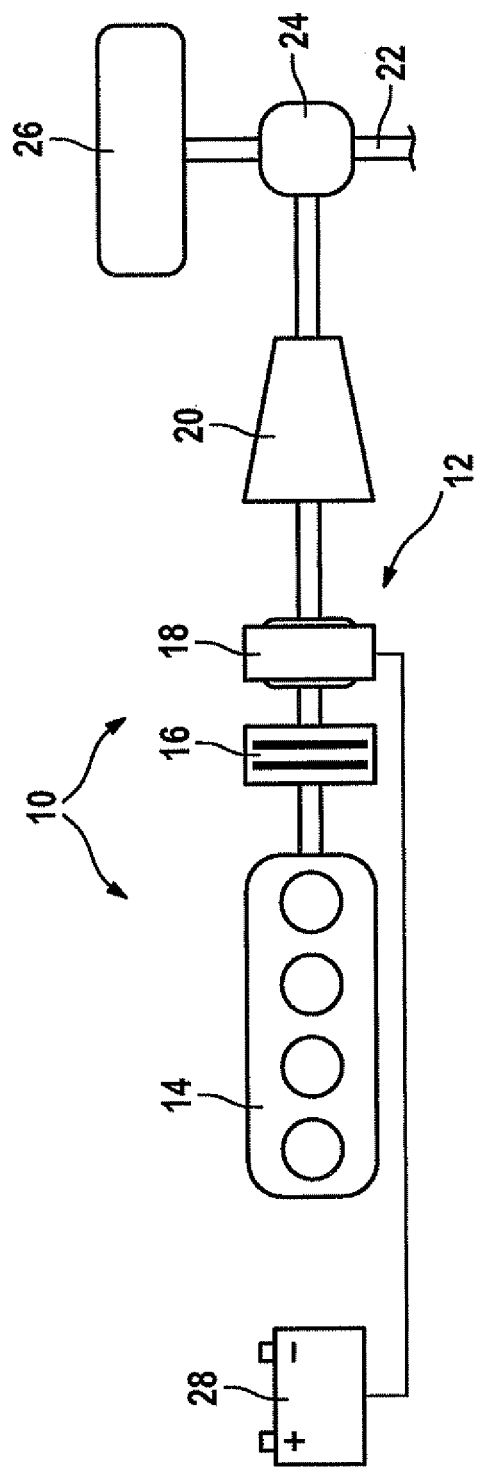
FIG. 1 shows the construction of the drive train of a parallel hybrid drive.

A hybrid drive may be seen designed as a parallel hybrid drive in the illustration according to FIG. 1.

A hybrid drive 10 shown in FIG. 1 is designed as a parallel hybrid and includes a drive train 12, in which an internal combustion engine 14 is accommodated. The internal combustion engine 14 is preferably a direct fuel injecting internal combustion engine, such as an Otto engine having direct gasoline injections. Hybrid drive 10 shown in FIG. 1 also includes a separating clutch 16 as well as at least one electric drive 18. Separating clutch 16 is located between internal combustion engine 14, which is preferably designed as a direct fuel injecting internal combustion engine, and the at least one electric drive 18. Drive train 12 of hybrid drive 10 shown in FIG. 1 additionally includes a vehicle transmission 20, which acts upon an axle drive 24 of a drive axle 22. Reference numeral 26 denotes a driven wheel that is accommodated on drive axle 22. Moreover, hybrid drive 10 shown in FIG. 1 has a traction battery 28 which, generally, is developed as a high voltage battery and which feeds the at least one electric drive 18.

The special feature of drive train 12 is that it is only able to be utilized for a purely electrical operation in which separating clutch 16 remains open. If the power of the electrical traction branch, including traction battery 28 and the at least one electric drive, is no longer sufficient for the propulsion of the vehicle, internal combustion engine 14, which is an Otto engine having direct injection, for example, is put into rotation using a direct start. The use of a direct fuel injecting internal combustion engine 14, such as an Otto engine having direct gasoline injection, has the advantage that, in comparison to starting internal combustion engine 14 using a conventional starter, a lesser noise emission occurs, that the starter, that would otherwise be required, may be omitted completely, which creates additional installation space in the engine compartment, and that a traction-neutral starting of internal combustion engine 14 is able to take place at a given power transmission to the driven wheels. In addition, drive train 12 having hybrid drive 10 is distinguished by the fact that a short starting time may be achieved.

Figure 2:
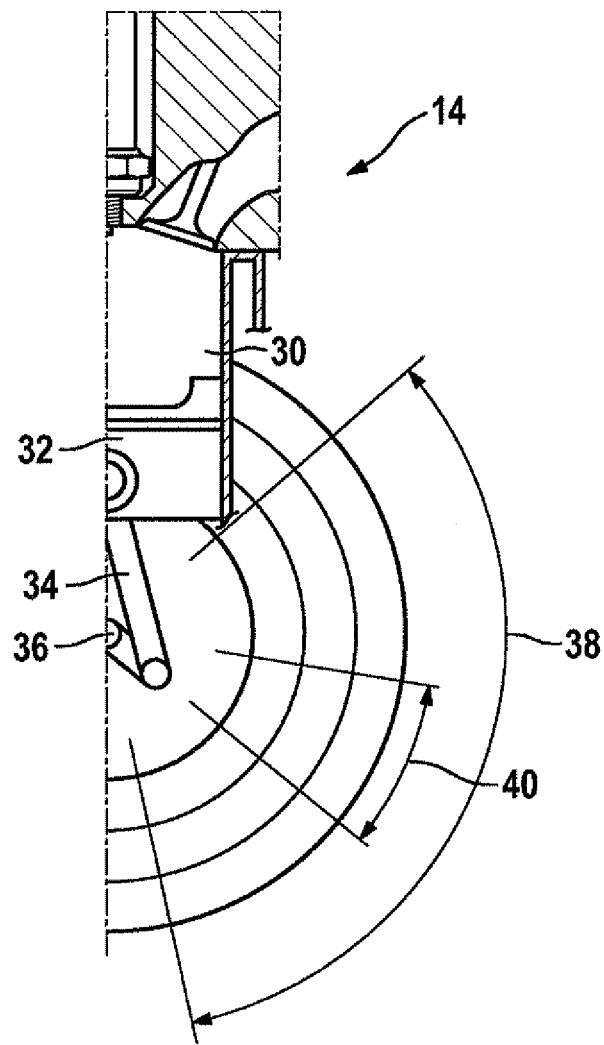
FIG. 2 shows the settling oscillation angle as well as the targeted shut-down range of an internal combustion engine, particularly of a direct gasoline injecting Otto engine.

From the illustration according to FIG. 2 one may infer, for instance, a cylinder of the internal combustion engine shown in FIG. 1, having direct fuel injection.

One may see from the illustration in FIG. 2, which is reproduced in half section, that internal combustion engine 14 is a direct injecting internal combustion engine, such as an Otto engine having direct gasoline injection. The internal combustion engine 14, that is preferably designed as an Otto engine having direct gasoline injection, may be started using a direct start. The fuel is injected, in this instance, into the combustion chamber of a cylinder 30, whose piston 32 is located in the power stroke position. The prerequisite for a successful start is a crankshaft position 36 between 100° and 120° after top dead center. The direct start of an internal combustion engine 14, that is thus developed, is favored by there being either only a slight quantity of residual gas, or no residual gas at all, within cylinder 30. After the previous operating cycle of internal combustion engine 14, the latter is shut down, at least one cylinder of the internal combustion engine being within the settling oscillation angle range shown in FIG. 2. The target shut-down range, which piston 32 of cylinder 30 of direct fuel injecting internal combustion engine 14 should preferably attain is emphasized in FIG. 2 by reference numeral 40. However, since it is not certain that internal combustion engine 14 will stop exactly within target shut-down range 40, a dynamic direct start may be undertaken. Within the dynamic direct start, crankshaft 36 of internal combustion engine 14 that is preferably developed as a direct fuel injecting internal combustion engine, is moved by an external force which is applied by slip torque-controlled separating clutch 16. When the engine control associated with internal combustion engine 14 detects a favorable position for a direct start, injection and ignition are able to take place.

Figure 3:
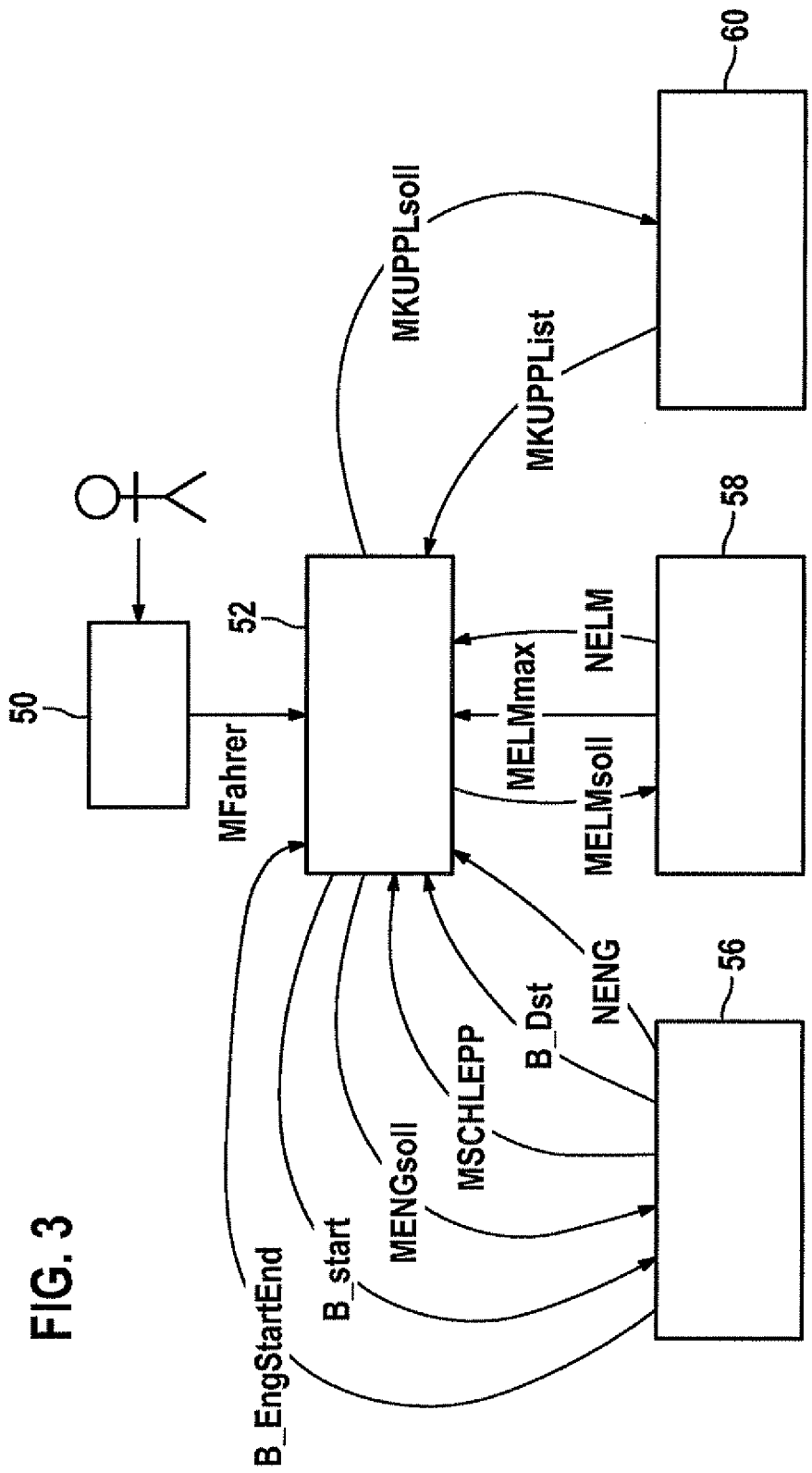
FIG. 3 shows the system structure for controlling the interplay of the components of the parallel hybrid drive shown in FIG. 1, that is, of the internal combustion engine of the at least one electric drive and the separating clutch.

FIG. 3 shows a system structure for controlling the interaction of the components internal combustion engine, electric drive and separating clutch of the parallel hybrid drive shown in FIG. 1.

One may see from FIG. 3 that the system structure shown there has an accelerator 50 that is operable by the driver. The torque command by the driver is converted via accelerator 50. The torque command by the driver, $M_{driver}$, is transmitted by accelerator 50 to a controller 52 of the overall system (hybrid control). Control space 52 of the overall system hybrid drive has subordinate to it a controller 56 for internal combustion engine 14, a controller 58 for the at least one electric drive 18, as well as a controller 60 for controlling separating clutch 16 of hybrid drive 10, according to the illustration in FIG. 1.

The individual interfaces between controllers 52, 56, 58 and 60 appear as follows:

Controller 56 of internal combustion engine 14 transmits a rotary speed information N_ENG of internal combustion engine 14, a state signal, such as a Flag B_DST for indicating the readiness for direct start of internal combustion engine 14, an information concerning the drag torque of internal combustion engine 14, such as a Flag M_DRAG, as well as possibly an information such as a Flag B_ENG START END for indicating the end of a starting process of internal combustion engine 14, to controller 52 of the overall system. The latter, in turn, if necessary, transmits information such as Flag B_START, for the start of the internal combustion engine, to controller 56 of internal combustion engine 14. As a function of the torque command $M_{driver}$ by the driver, information $M\_ENGSET_{POINT}$ with respect to the setpoint torque that is to be generated by internal combustion engine 14 is also transmitted to controller 56 of internal combustion engine 14. Finally, controller 56 of internal combustion engine 14 returns a rotary speed information N_ENG with respect to the current speed of internal combustion engine 14 to controller 52 of the overall system.

Controller 52 of the overall system emits information with respect to setpoint torque $M\_ELM_{SETPOINT}$ that is to be generated by the at least one electric drive 18 to controller 58 of the at least one electric drive 18, and is supplied by controller 58 with information with respect to the maximally convertible torque of the at least one electric drive 18 $M\_ELM_{MAX}$, as well as the current speed N_ELM of the at least one electric drive 18.

Controller 60 of separating clutch 16 of hybrid drive 10 supplies information $M\_CLUTCH_{ACTUAL}$, with respect to the actual slip torque of separating clutch 16, to controller 52 of the overall system, and receives from it information with respect to specified setpoint slip torque $M\_CLUTCH_{SETPOINT}$, at which separating clutch 16 is to be operated according to the driver's command.

Figure 4:
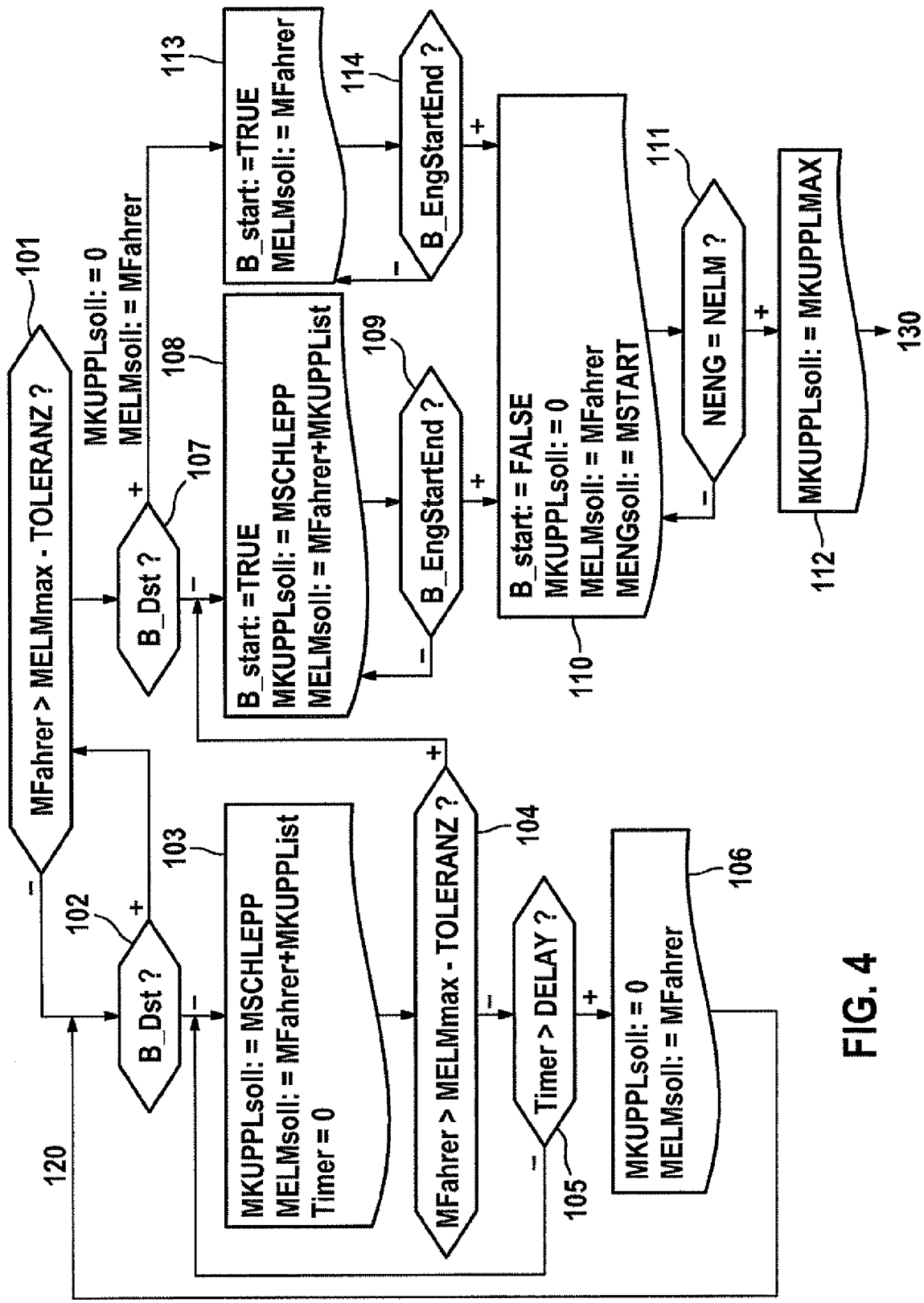
FIG. 4 shows an algorithm for starting the direct fuel injecting internal combustion engine having direct starting from purely electrical driving operation.

In FIG. 4 one may see in exemplary fashion the information flow in the system structure shown in FIG. 3, between the individual components of this system structure.

In a first step 101 it is first checked whether the torque command $M_{driver}$ of the driver is able to be covered alone by the at least one electric drive 18. Within first step 101, torque command $M_{driver}$ is checked as to whether it is greater than setpoint torque $M\_ELM_{SETPOINT}$ of the at least one electric drive 18, less a TOLERANCE. The value TOLERANCE represents a dynamic reserve which is used in starting internal combustion engine 14, in order to compensate for the drop in rotary speed of the at least one electric drive 18, which is of necessity connected to the start of internal combustion engine 14. Within a second step 102 it is checked whether there is a direct starting readiness present at internal combustion engine 14 or not, that is, the state of a flag B_DST is queried, as to whether it is set or not set. If flag B_DST is set, this means that internal combustion engine 14 is positioned for the direct start mode, and that a direct start may be made. The command to start internal combustion engine 14, however, first takes place only in step 108 or 113.

If flag B_DST is not set, the system transits to third step 103, and separating clutch 16 is regulated to slip torque M_SLIP of internal combustion engine 14. This starts internal combustion engine 14. In this case, the at least one electric drive 18 compensates for the actually set slip torque $M\_CLUTCH_{ACTUAL}$, that is, the actual slip torque of the separating clutch. A timer previously set to 0 is started. Third step 103 is carried out until a time span DELAY has expired. In third step 103, setpoint torque $M\_CLUTCH_{SETPOINT}$ is set to slip torque M_SLIP of internal combustion engine 14, setpoint torque $M\_ELM_{SETPOINT}$ and of the at least one electric drive 18 is set to the combined torque of torque command $M_{driver}$ and $M\_CLUTCH_{ACTUAL}$ of separating clutch 16.

In a fourth method step 104, it is again checked whether torque command $M_{driver}$ makes switching internal combustion engine 14 on or not. If this is the case, third method step 102 has to be broken off, and internal combustion engine 14 has to be started by a dynamic start, which takes place within eighth step 108, to which branching takes place, in this case.

In a fifth step 105 following fourth step 104 in the case of a negative result, it is checked whether the time span specified by DELAY has expired or not. If the answer is yes, the system branches to a sixth step 106 which opens separating clutch 16, so that the torque command $M_{driver}$ of the driver is converted only by the at least one electric drive 18. This characterizes the purely electric drive operation indicated by reference numeral 120.

If the result of fifth step 105 is negative, that is, if time span DELAY has not expired yet, branching goes again to ahead of step 103, and the system runs through it again.

If the system has switched to purely electrical drive operation 120, which takes place according to the sixth step, internal combustion engine 14 will stop oscillating, and, in the process, it will preferably take up the start position shown in FIG. 2, that is, target shut-off range 40. In addition, the system checks again for direct start readiness by querying flag B_DST.

After first step 101, that is, whether torque command $M_{driver}$ is able to be covered only by electric drive 18 alone or not, a seventh step is taken parallel to second step 102. In it, the state of flag B_DST is queried.

If torque command $M_{driver}$ is not able to be covered by the at least one electric drive 18, and there is no direct start readiness, that is, flag B_DST is not set, the system runs through an eighth step and a dynamic direct start is triggered. In this case, flag B_START is set to the value TRUE, setpoint moment $M\_CLUTCH_{SETPOINT}$ is set to the engine slip torque M_SLIP, and setpoint torque $M\_ELM_{SETPOINT}$ of the at least one electric drive 18 is set to the value which is given by the sum of torque command $M_{driver}$ plus actual torque $M\_CLUTCH_{ACTUAL}$ of separating clutch 16. Via controller 56, internal combustion engine 14 receives the start command, while the internal combustion engine is simultaneously cranked through by the application of separating clutch 16. In this case, separating clutch 16 is regulated to slip torque M_SLIP, as was mentioned above, is to be compensated by the at least one electric drive 18.

In a ninth step 109, which follows eighth step 108, a flag B_ENG START END checked to see whether it is set or not set, that is, whether internal combustion engine 14 has been started or not.

If internal combustion engine 14 has been started, the start command to internal combustion engine 14 is canceled again within a tenth step 110, that is, flag B_START is set to the value FALSE again. Setpoint slip torque $M\_CLUTCH_{SETPOINT}$ is set to 0, setpoint torque $M\_ELM_{SETPOINT}$ of the at least one electric drive 18 is set to torque command $M_{driver}$, and setpoint torque $M\_ENG_{SETPOINT}$ of internal combustion engine 14 is set to the value $M_{START}$. The value $M\_ENG_{SETPOINT}$ originates from a characteristics curve which specifies a rotary speed-dependent setpoint torque for internal combustion engine 14.

Thereafter, in tenth step 110, separating clutch 16 is opened, so as not to impede internal combustion engine 14 during its synchronization with the current speed N_ELM of the at least one electric drive 18.

In an eleventh step 111 following tenth step 110 it is queried whether speed N_ENG of internal combustion engine 14 is equal to the current speed N_ELM of the at least one electric drive 18. If this is denied, the system again branches back to tenth step 110. If the answer is yes, branching to twelfth step 112 takes place, and setpoint torque $M\_CLUTCH_{SETPOINT}$ of separating clutch 16 is set to the maximally transmittable torque value $M\_CLUTCH_{MAX}$. After the system has run through twelfth step 112, hybrid operation 130 is present, that is, the vehicle is simultaneously driven by internal combustion engine 14 and the at least one electric drive 18.

In the case in which, according to the second and seventh step 102, 107, flag B_DST takes on the value TRUE, direct start readiness of internal combustion engine 14 is present, and branching does not proceed to eighth step 108 but rather to a thirteenth step, so that the torque command $M_{driver}$ of the driver that is not able to be achieved by the at least one electric drive 18 alone is fulfilled by switching on internal combustion engine 14. Since flag B_DST is set, there is a direct start readiness present of internal combustion engine 14, and it is then able to be started without moving it using a closing process of separating clutch 16. This advantageous property of a direct fuel injecting internal combustion engine 14, such as an Otto engine having direct gasoline injection, is utilized advantageously in this connection.

After the running through of thirteenth step 113 it is checked whether internal combustion engine 14 has been started, that is, the state of flag B_ENG START END is queried for the value TRUE or FALSE, and then branching takes place to tenth step 110, which was explained above.

Figure 5:
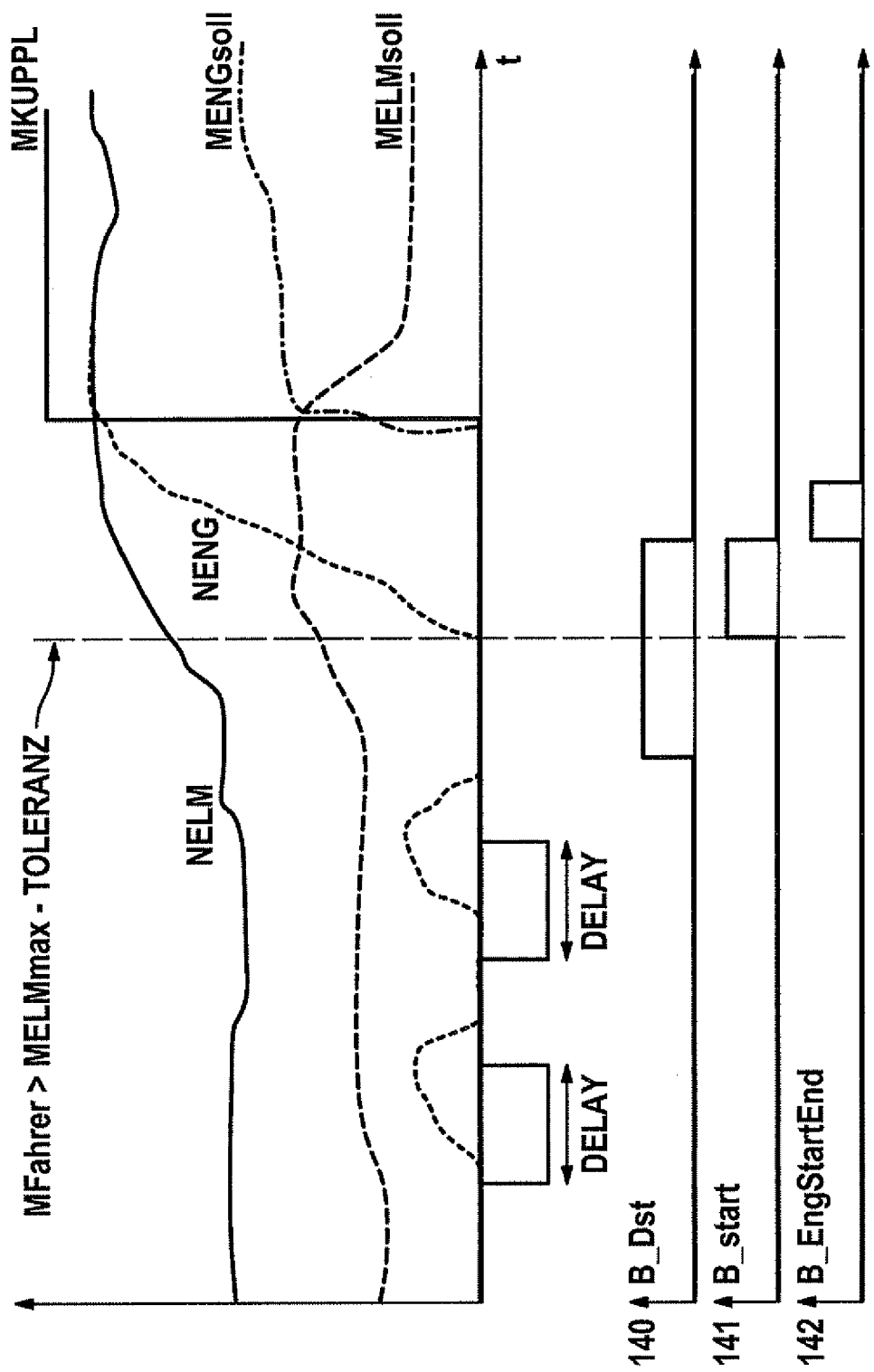
FIG. 5 shows a conditioning of the internal combustion engine during the purely electrical driving operation and the later direct start at stationary internal combustion engine.

In the illustration according to FIG. 5 one may see a conditioning of the internal combustion engine during the electric drive mode, and the direct start of the stationary internal combustion engine resulting from this.

Internal combustion engine 14 is conditioned during purely electric drive operation 120, according to the illustration in FIG. 5. During the two time spans denoted by DELAY in FIG. 5, controller 52 of the overall system undertakes two start attempts, until the direct start readiness is indicated by the internal combustion engine, that is, flag B_DST takes on the value TRUE. This becomes apparent from signal curve 140, which reflects the state of flag B_DST in FIG. 5. At the point in time at which desired torque $M_{driver}$ is no longer able to be covered by the at least one electric drive, that is, torque command $M_{driver}$ is greater than the maximally to be provided torque of the at least one electric drive $M\_ELM_{MAX}$ less the TOLERANCE, internal combustion engine 14 is started, that is, flag B_START is set to the value TRUE (cf. signal curve 141 in FIG. 5). In FIG. 5, the successful start is shown by a great speed increase in speed N_ENG of internal combustion engine 14. If the speed of internal combustion engine MENG and of the electric drive are synchronized with each other, closing of separating clutch 16 takes place. For this closing, the maximum setpoint torque is specified to separating clutch 16, so that separating clutch 16 closes completely.

According to the signal flow plan described in connection with FIG. 4, the method steps are run through in the following sequence: 102, 103, 104, 106, 102, 103, 104, 106, 101, 113, 114, 110, 111 and 112.

Figure 6:
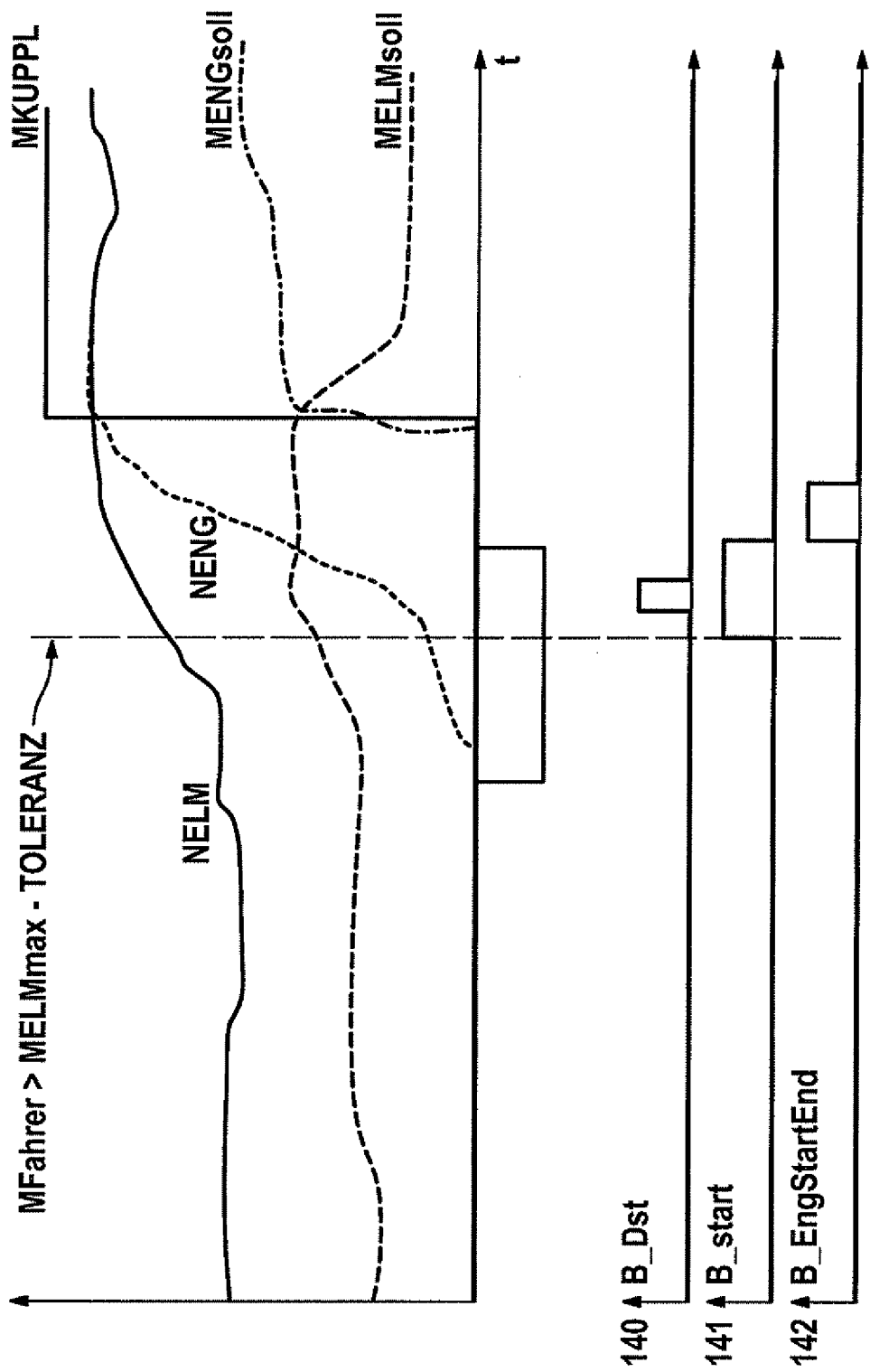
FIG. 6 shows a start demand which interrupts the conditioning of the direct fuel injecting internal combustion engine shown in FIG. 5, and results in a dynamic direct start of the direct fuel injecting internal combustion engine.

The illustration according to FIG. 6 shows the case in which a start request to the internal combustion engine interrupts its conditioning shown in FIG. 5, and a dynamic direct start is required.

In the case shown in FIG. 6, the conditioning is interrupted by an increased torque command $M_{driver}$ to the drive, shown by the vertically running dashed line. In this case, torque command $M_{driver}$ exceeds the maximum torque $M\_ELM_{MAX}$ that is able to be supplied by the at least one electric drive 18, less the TOLERANCE. In this case, the running through of eighth method step 108 according to the illustration in FIG. 4 takes place, to carry out a dynamic direct start. According to curve 141 of the state of flag B_START, the latter is set to the value TRUE, flag B_DST is set to TRUE to indicate the direct start readiness of the internal combustion engine, and the internal combustion engine is cranked through by closing separating clutch 16. In this process, separating clutch 16 is regulated to drag torque M-DRAG of internal combustion engine 14. Drag torque M_DRAG transmitted by separating clutch 16 and internal combustion engine 14 has to be compensated for by the at least one electric drive 18, whose rotary speed drops off. According to the illustration in FIG. 6, the following steps, according to the flow chart in FIG. 4, are run through: 102, 103, 104, 102, 103, 104, 108, 109, 108, 109, 110, 111 und 112.

What is claimed is:

1. A method for operating a hybrid drive of a vehicle having an internal combustion engine and at least one electric drive to which at least one traction battery is assigned, the method comprising:
   starting the internal combustion engine from a purely electrical driving operating mode of the hybrid drive using a direct start without a starter;
   wherein the internal combustion engine of the hybrid drive is started as a function of a torque command of a driver, if the at least one electric drive is not able to implement a desired torque;
   wherein in response to a non-presence of direct start readiness of the internal combustion engine, a slip torque-regulated separating clutch transmits an engine drag-torque to the internal combustion engine; and
   wherein after an expiration of a time span within which the internal combustion engine is not started, the separating clutch is opened and the internal combustion engine stops oscillating within a settling oscillating range, the settling oscillating range being within a target shut-off range.

2. The method as recited in claim 1,
   wherein the starting is performed without assistance from sources that are configured to start the internal combustion engine by cranking from outside the internal combustion engine.

3. The method as recited in claim 1, wherein in response to a presence of direct start readiness of the internal combustion engine, the internal combustion engine is started in response to opened separating clutch.

4. The method as recited in claim 1, wherein in response to an increasing torque command by the driver, the internal combustion engine is started by a dynamic direct start using a start command to a controller.

5. The method as recited in claim 1, wherein the target shut-off range of the internal combustion engine is defined by a setting of at least one cylinder between 100° and 120° past top dead center.

6. The method as recited in claim 1, wherein the hybrid drive is monitored by a controller which has subordinate to it a controller for the internal combustion engine, a controller for the at least one electric drive and a controller for a separating clutch, and the controller implements the torque command of the driver using the at least one electric drive.

7. A parallel hybrid drive of a vehicle, comprising:
an internal combustion engine;
at least one electric drive; and
at least one traction battery assigned to the at least one electric drive;
wherein a direct start of the internal combustion engine from a purely electrical driving operating mode of the hybrid drive is performed without using a starter;
wherein the internal combustion engine of the hybrid drive is started as a function of a torque command of a driver, if the at least one electric drive is not able to implement a desired torque;
wherein in response to a non-presence of direct start readiness of the internal combustion engine, a slip torque-regulated separating clutch transmits an engine drag-torque to the internal combustion engine; and
wherein after an expiration of a time span within which the internal combustion engine is not started, the separating clutch is opened and the internal combustion engine stops oscillating within a settling oscillating range, the settling oscillating range being within a target shut-off range.

8. The drive of claim 7 wherein the direct start is performed without assistance from sources that are configured to start the internal combustion engine by cranking from outside the internal combustion engine.

9. The drive of claim 7, wherein in response to a presence of direct start readiness of the internal combustion engine, the internal combustion engine is started in response to opened separating clutch.

10. The drive of claim 7, wherein in response to an increasing torque command by the driver, the internal combustion engine is started by a dynamic direct start using a start command to a controller.

11. The drive of claim 7, wherein the target shut-off range of the internal combustion engine is defined by a setting of at least one cylinder between 100° and 120° past top dead center.

12. The drive of claim 7, wherein the hybrid drive is monitored by a controller which has subordinate to it a controller for the internal combustion engine, a controller for the at least one electric drive and a controller for a separating clutch, and the controller implements the torque command of the driver using the at least one electric drive.

* * * * *

UNITED STATES PATENT AND TRADEMARK OFFICE
CERTIFICATE OF CORRECTION

PATENT NO. : 8,480,536 B2  Page 1 of 1
APPLICATION NO. : 12/162819
DATED : July 9, 2013
INVENTOR(S) : Weiss et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1168 days.

Signed and Sealed this
Eighth Day of September, 2015

Michelle K. Lee
*Director of the United States Patent and Trademark Office*